United States Patent
Nam et al.

(10) Patent No.: US 8,264,162 B2
(45) Date of Patent: Sep. 11, 2012

(54) INVERTER APPARATUS

(75) Inventors: Goang-Woo Nam, Kyoto (JP); Junichi Hagino, Kyoto (JP); Kenichi Fukumoto, Kyoto (JP)

(73) Assignee: Rohm Co., Ltd. (JP)

( * ) Notice: Subject to any disclaimer, the term of this patent is extended or adjusted under 35 U.S.C. 154(b) by 621 days.

(21) Appl. No.: 12/479,089

(22) Filed: Jun. 5, 2009

(65) Prior Publication Data

US 2010/0149458 A1    Jun. 17, 2010

(30) Foreign Application Priority Data

| Jun. 5, 2008 | (JP) | 2008-148341 |
| Jun. 19, 2008 | (JP) | 2008-160032 |
| Apr. 23, 2009 | (JP) | 2009-105485 |

(51) Int. Cl.
   *H05B 37/00*    (2006.01)

(52) U.S. Cl. ......... 315/224; 315/307; 315/308

(58) Field of Classification Search ......... 315/224, 315/219, 225, 223, 291, 307, 308, DIG. 2, 315/DIG. 5, DIG. 7
See application file for complete search history.

(56) References Cited

U.S. PATENT DOCUMENTS

| 6,429,603 B1 * | 8/2002 | Tsugita et al. ......... 315/224 |
| 7,482,765 B2 * | 1/2009 | Ito et al. ......... 315/312 |

FOREIGN PATENT DOCUMENTS

| JP | 2002-134293 A | 5/2002 |
| JP | 2003-323994 A | 11/2003 |
| JP | 2004-335422 A | 11/2004 |
| JP | 2005-108784 A | 4/2005 |
| JP | 2007-288872 A | 11/2007 |
| WO | 2005/038828 A2 | 4/2005 |

* cited by examiner

*Primary Examiner* — David Hung Vu
(74) *Attorney, Agent, or Firm* — Cantor Colburn LLP

(57) ABSTRACT

A switching circuit includes multiple transistors connected to the primary winding of a transformer, and alternately applies an input voltage and a ground voltage to the primary winding according to the ON/OFF operations of the transistors. Multiple ballast capacitors are respectively provided to multiple fluorescent lamps. One terminal of each ballast capacitor is connected to the secondary winding so as to form a common terminal. The other terminal thereof is connected to the fluorescent lamp. A first capacitor and a second capacitor are arranged in this order in series between an connection node that connects the fluorescent lamp to be monitored and the corresponding ballast capacitor and the ground terminal. An abnormal state judging unit compares the voltage at the connection node that connects the first capacitor and the second capacitor with a predetermined threshold voltage.

15 Claims, 7 Drawing Sheets

INVERTER APPARATUS

BACKGROUND OF THE INVENTION

1. Field of the Invention

The present invention relates to an inverter apparatus which converts a DC input voltage into an AC voltage, and supplies the AC voltage thus converted to a load.

2. Description of the Related Art

In recent years, liquid crystal display TVs, which provide a TV having a thin shape and a large size, are becoming popular as replacements for CRT-based TVs. Liquid crystal display TVs include multiple cold cathode fluorescent lamps (which will be referred to as "CCFLs" hereafter) or external electrode fluorescent lamps (which will be referred to as "EEFLs" hereafter) arranged on the back face of a liquid crystal panel on which video images are to be displayed, which are used as light-emitting backlights.

The CCFL or EEFL is driven using an inverter (DC/AC converter) which boosts DC voltage of around 12 V, and which outputs the voltage thus boosted in the form of AC voltage, for example. The inverter converts the current flowing through the fluorescent lamp into voltage, and returns the voltage thus converted to a control circuit as a feedback voltage, thereby controlling the ON/OFF operation of a switching element based upon the voltage thus fed back. For example, related art is disclosed in the Patent documents listed later.

Here, let us consider an arrangement in which multiple fluorescent lamps are driven using the AC voltage boosted by the inverter. The light emission luminance of each fluorescent lamp is determined by the current that flows through the fluorescent lamp itself. Accordingly, in order to provide uniform light emission by multiple fluorescent lamps, or in order to produce a desired difference in the light emission luminance, there is a need to control the current that flows through each fluorescent lamp.

However, such an arrangement in which a feedback operation is performed for the current that flows through each of the multiple fluorescent lamps requires a control circuit arranged for each fluorescent lamp. However, in a case in which several to tens of fluorescent lamps are driven such that they emit light at the same time in an application such as a Liquid crystal display TV or a liquid crystal monitor, an arrangement that includes a great number of built-in control circuits is undesirable from the perspective of the mounting area, costs, and power consumption.

Here, let us consider an arrangement in which multiple fluorescent lamps are driven using the AC voltage boosted by the inverter. The light emission luminance of each fluorescent lamp is determined by the current that flows through the fluorescent lamp itself. Accordingly, in order to provide uniform light emission by multiple fluorescent lamps, or in order to produce a desired difference in the light emission luminance, there is a need to control the current that flows through each fluorescent lamp.

However, such an arrangement in which a feedback operation is performed for the current that flows through each of the multiple fluorescent lamps requires a control circuit arranged for each fluorescent lamp. However, in a case in which several to tens of fluorescent lamps are driven such that they emit light at the same time in an application such as a Liquid crystal display TV or a liquid crystal monitor, an arrangement that includes a great number of built-in control circuits is undesirable from the perspective of the mounting area, costs, and power consumption. The present applicant has proposed an inverter which is capable of solving such a problem (Patent document 5). With the inverter apparatus disclosed in Patent document 5, the currents that flow through multiple fluorescent lamps are appropriately controlled by a single feedback system (control circuit).

RELATED ART DOCUMENTS

Patent Documents

[Patent Document 1]
Japanese Patent Application Laid Open No. 2003-323994
[Patent Document 2]
International Publication WO 2005/038828 pamphlet
[Patent Document 3]
Japanese Patent Application Laid Open No. 2002-134293
[Patent Document 4]
Japanese Patent Application Laid Open No. 2004-335422
[Patent Document 5]
Japanese Patent Application Laid Open No. 2007-288872
[Patent Document 6]
Japanese Patent Application Laid Open No. 2005-108784

Problem 1: With CCFLs or EEFLs, a state in which a given CCFL does not emit light occurs according to the laws of probability. Furthermore, in a case in which a CCFL or EEFL has been disconnected from a connector, the light emission operation thereof cannot be performed. In the apparatus disclosed in Patent document 5, the feedback voltage that corresponds to the load current is approximately zero in a situation in which all the fluorescent lamps do not emit light. Accordingly, such an abnormal state (a state in which the fluorescent lamps do not emit light) can be detected, and thus, processing for turning on the fluorescent lamps can be executed again. However, in some cases, a situation in which some fluorescent lamps emit light and the other fluorescent lamps do not emit light leads to a problem in that the feedback operation continues to be in effect even in such a situation.

That is to say, in the technique disclosed in Patent document 5, an advantage is provided by detection of whether or not light emission is being performed in increments of fluorescent lamps.

Problem 2: In order to drive the fluorescent lamps in the stable state, there is a need to detect abnormal states such as malfunctions of the fluorescent lamp, arc discharge due to poor connection of the lamp, etc., and to protect the circuit as necessary.

SUMMARY OF THE INVENTION

1. An embodiment according to the present invention has been made in order to solve the problem 1. It is an exemplary purpose thereof to provide an inverter apparatus which is capable of driving multiple loads such as fluorescent lamps or the like using a shared control circuit, and which is capable of detecting an abnormal state of each load.

An embodiment according to the present invention relates to an inverter apparatus which converts an input voltage into an AC driving voltage, and which supplies the AC driving voltage thus converted to multiple loads. The inverter apparatus includes: a transformer having a primary winding and a secondary winding; a switching circuit including multiple transistors connected to the primary winding of the transformer, and which alternately applies, to the primary winding of the transformer, the input voltage and a fixed voltage which is lower than the input voltage according to the ON/OFF operations of the transistors; multiple ballast capacitors which are respectively provided for the multiple loads, and of which one terminal of each ballast capacitor is connected to the secondary winding of the transformer so as to form a common terminal, and the other terminals of which are respectively connected to the multiple loads; a control circuit which monitors an electric current that flows through a predetermined current path among current paths included in the entire circuit including the inverter apparatus and the loads, and which feedback controls the ON/OFF states of the multiple transistors included in the switching circuit such that the current thus monitored is maintained in a predetermined state, thereby adjusting a switching electric power supplied to the primary winding of the transformer; and an abnormal state detection circuit provided for a load which is a monitoring target selected from among the multiple loads. The abnormal state detection circuit includes: a first capacitor and a second capacitor arranged in this order in series between a connection node that connects the load to be monitored and the ballast capacitor that corresponds to the load and a fixed voltage terminal; and an abnormal state judging unit which compares the voltage at a connection node which connects the first capacitor and the second capacitor with a predetermined threshold voltage.

With such an embodiment, the multiple loads and the respective ballast capacitors, each of which is connected to a corresponding load, form multiple current paths connected in parallel. The same voltage is applied to each of the multiple current paths. Accordingly, a current flows through each path according to the combined impedance of the corresponding ballast capacitor and the load. With such an embodiment, the current that flows through each of the multiple loads can be directly or indirectly controlled by adjusting the capacitances of the ballast capacitors using the shared control circuit. Furthermore, in a case in which an abnormal state occurs in the load to be monitored, the load impedance seen by the connection node changes, thereby leading to a change in the voltage at the connection node. Thus, such an arrangement allows an abnormal state of the load to be detected by dividing the voltage at the connection node by the first and second capacitors, and by comparing the voltage thus divided with a threshold value.

Also, multiple abnormal state detection circuits may be respectively provided for the aforementioned loads. With such an arrangement, the abnormal state can be independently detected for each of the multiple loads.

Also, each of the multiple loads may be a device having capacitance that changes depending upon whether the operation state is normal or abnormal.

Each of the ballast capacitor and the first and second capacitors is a capacitive element. Accordingly, the change in the capacitance of the load leads to a change in the combined load impedance (combined capacitance) seen by the connection node. This leads to a change in the voltage at the connection node. That is to say, such an arrangement suitably detects such an abnormal state of the load.

Also, each of the multiple loads may be a fluorescent lamp.

Also, each of the multiple abnormal state detection circuits may further include a diode, the anode of which is connected to a connection node that connects the corresponding first capacitor and the corresponding second capacitor. Also, the cathodes of the diodes, which are respectively provided for the multiple abnormal state detection circuits, may be connected so as to form a common cathode terminal. Also, the multiple abnormal state detection circuits may share a single abnormal state judging unit which compares the voltage at the cathode of the diodes with the threshold voltage.

With such an arrangement configured such that, in a case in which an abnormal state occurs at the load, the voltage at the connection node that connects the first capacitor and the second capacitor rises, the abnormal state judging unit can be provided in the form of a shared unit by forming a maximum value circuit using diodes, thereby reducing the circuit area.

Also, the capacitances of the multiple ballast capacitors may be set according to the relative luminance values provided by the multiple fluorescent lamps. A current flows through each of the multiple current paths having a configuration including the fluorescent lamp and the ballast capacitor, corresponding to the impedance of the fluorescent lamp and the ballast capacitor. Thus, such an arrangement is capable of adjusting the current that flows through each fluorescent lamp by adjusting the corresponding capacitance.

Also, at least a part of the multiple ballast capacitors and the first and second capacitors, which are respectively provided for the multiple abnormal state detection circuits, may be configured of a pattern circuit formed on a printed circuit board on which the inverter apparatus is mounted.

With such an arrangement, there is no need to provide chip components, thereby reducing costs.

Also, the control circuit may monitor a current that flows through a current path including a predetermined load from among the multiple loads. Also, the control circuit may control the ON/OFF states of the multiple transistors included in the switching circuit such that the current that flows through the predetermined load approaches a predetermined current value.

Such an arrangement is capable of directly feedback controlling the current that flows through a predetermined load such that the current approaches a predetermined current value. Furthermore, such an arrangement is capable of indirectly controlling the current that flows through each of the other loads such that the current approaches a predetermined current value.

Also, the control circuit may include: a feedback circuit provided on a current path including the predetermined load, and which generates a feedback signal which indicates a voltage value that corresponds to a current that flows through the predetermined load; a pulse modulator which receives the feedback signal from the feedback circuit, and generates a pulse modulation signal by comparing the feedback signal with a predetermined reference voltage; and a driver circuit which receives the pulse modulation signal from the pulse modulator, and which controls the ON/OFF operations of the multiple transistors included in the switching circuit according to the pulse modulation signal.

The total current, which is the sum of the currents that flow through the multiple loads, flows through the secondary winding of the transformer. In this stage, a current flows through each of the multiple loads, which is distributed according to the combined impedance of the corresponding path including the corresponding load. Thus, such an arrangement provides stable current that flows through each of the multiple loads by maintaining the current that flows through the secondary winding of the transformer in a stable state.

Also, the control circuit may monitor a current that flows through a current path including a secondary winding of the transformer, and may control the ON/OFF states of the multiple transistors included in the switching circuit such that a current that flows through the secondary winding of the transformer approaches a predetermined current value.

Also, the control circuit may include: a feedback circuit which is provided on a current path including the secondary winding of the transformer, and which generates a feedback signal which indicates a voltage value that corresponds to the current that flows through the secondary winding of the transformer; a pulse modulator which receives the feedback signal from the feedback circuit, and which generates a pulse modulation signal by comparing the feedback signal with a predetermined reference voltage; and a driver circuit which receives the pulse modulation signal from the pulse modulator, and which controls the ON/OFF operations of the multiple transistors included in the switching circuit according to the pulse modulation signal.

Another embodiment of the present invention relates to a light emitting apparatus. The light emitting apparatus includes: multiple fluorescent lamps; any one of the above-described inverter apparatuses, which supplies an AC driving voltage to one terminal of each of the multiple florescent lamps provided as loads.

With such an embodiment, the luminance of each of the multiple fluorescent lamps can be controlled using a shared control circuit. Furthermore, in a case in which there is a fluorescent lamp in an abnormal state in which the fluorescent lamp cannot emit light, such an arrangement is capable of detecting such an abnormal state and executing necessary processing.

Also, a light emitting apparatus according to an embodiment may further include any one of the above-described inverter apparatuses, which supplies an AC driving voltage to the other terminal of each of the multiple fluorescent lamps provided as loads. Also, the inverter apparatus provided on the one terminal side of the multiple fluorescent lamps and the other inverter provided on the other terminal side may generate driving voltages with opposite phases.

Also, each of the fluorescent lamps may be a cold cathode fluorescent lamp or an external electrode fluorescent lamp. With such an arrangement, fluctuation and irregularities in the impedance of the multiple fluorescent lamps can be suitably canceled out by means of the ballast capacitors, thereby maintaining, in a stable state, the current that flows through each of the multiple current paths each of which has a configuration including the fluorescent lamp and the ballast capacitor.

yet another embodiment of the present invention relates to a display apparatus. The display apparatus includes: a liquid crystal panel; and the above-described light emitting apparatus arranged as a backlight on the back face of the liquid crystal panel.

2. Yet another embodiment according to the present invention has been made mainly in order to solve the aforementioned problem 2. Accordingly, it is an exemplary purpose thereof to provide an inverter which is capable of detecting an abnormal state.

An embodiment of the present invention relates to a driving apparatus which converts an input voltage into an AC driving voltage, and which supplies the AC driving voltage thus converted to a fluorescent lamp. The driving apparatus includes: a transformer which includes a primary winding and a secondary winding, and in which the fluorescent lamp to be driven is connected on the secondary winding side; a switching circuit which includes multiple transistors connected to the primary winding of the transformer, and which alternately applies, to the primary winding of the transformer, the input voltage and a fixed voltage that is lower than the input voltage according to the ON/OFF operations of the transistors; a control circuit which feedback controls the ON/OFF states of the multiple transistors included in the switching circuit according to the electrical state of the fluorescent lamp, so as to adjust the switching electric power to be supplied to the primary winding of the transformer; a current/voltage conversion circuit which converts the current that flows through the secondary winding of the transformer into a voltage; a filter which removes low-frequency components of the output of the current/voltage conversion circuit; and an integrator which integrates the output of the filter, and outputs the output signal thus integrated as a detection signal. The control circuit detects whether or not the fluorescent lamp is in an abnormal state based upon the detection signal received from the integrator. In a case in which an abnormal state has been detected, the control circuit executes predetermined protection processing.

In an abnormal state such as an arc discharge state, high-frequency components are convolved with the current that flows through the secondary winding of the transformer. Such an arrangement is capable of detecting such an abnormal state by extracting the high-frequency components so as to generate a detection signal.

Also, the control circuit may compare the detection signal received from the integrator with a predetermined threshold value. Also, in a case in which the detection signal is greater than the threshold value, the control circuit may judge that an abnormal state has occurred, and may stop the feedback control operation for the switching circuit.

In a case in which an abnormal state continues for a predetermined period of time, the control circuit may stop a feedback control operation for the switching circuit.

Also, in a case in which the detection signal received from the integrator is greater than a predetermined threshold value, the control circuit may judge that an abnormal state has occurred, and may reduce the duty ratio of the ON/OFF operation of the switching circuit.

Such an arrangement is capable of reducing electric power while maintaining the light emission states of the fluorescent lamps by reducing the duty ratio, thereby protecting the circuit.

Also, the control circuit may include: an error amplifier which amplifies the difference between a feedback signal which indicates the electrical state of the fluorescent lamp and a predetermined reference voltage; a pulse width modulation comparator which makes a comparison between the output of the error amplifier and a cyclic signal, so as to generate a pulse width modulation signal; and a protection circuit which is configured such that, in a case in which the detection signal is greater than the threshold value, the protection circuit shifts the output level of the error amplifier such that the duty ratio of the pulse width modulation signal is reduced. The control circuit may feedback control the ON/OFF states of the multiple transistors included in the switching circuit according to the pulse width modulation signal.

Another embodiment of the present invention relates to a light emitting apparatus. The light emitting apparatus includes: a fluorescent lamp; and any one of the above-described driving apparatuses, which supplies a driving voltage to the fluorescent lamp.

Yet another embodiment of the present invention relates to a liquid crystal display apparatus. The liquid crystal display apparatus includes: a liquid crystal panel; and the multiple light emitting apparatuses described above, which are arranged on the back face of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B. In the same way, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

First Embodiment

Figure 1:
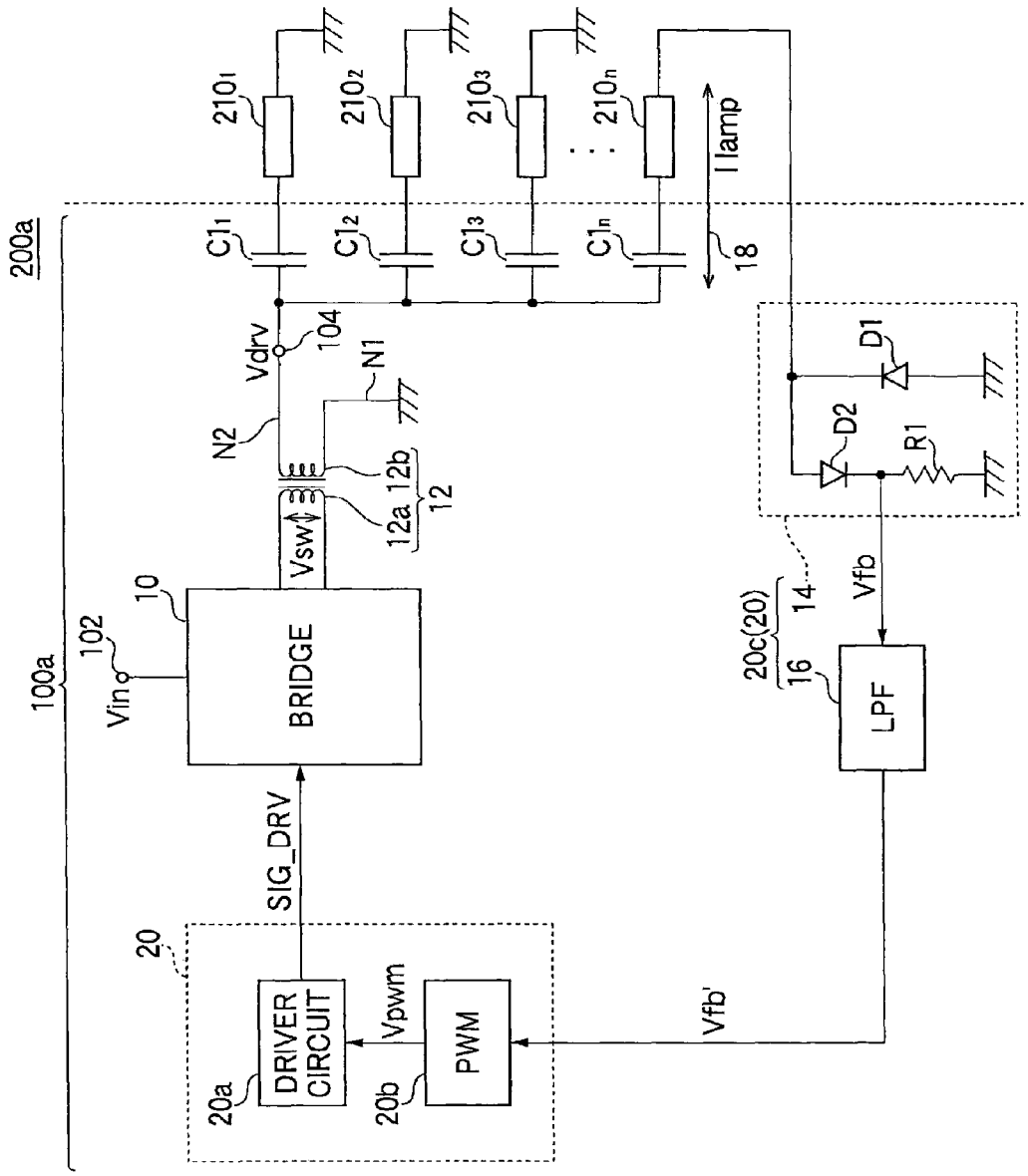
FIG. 1 is a circuit diagram which shows a configuration of a light emitting apparatus according to a first embodiment of the present invention.
Figure 2:
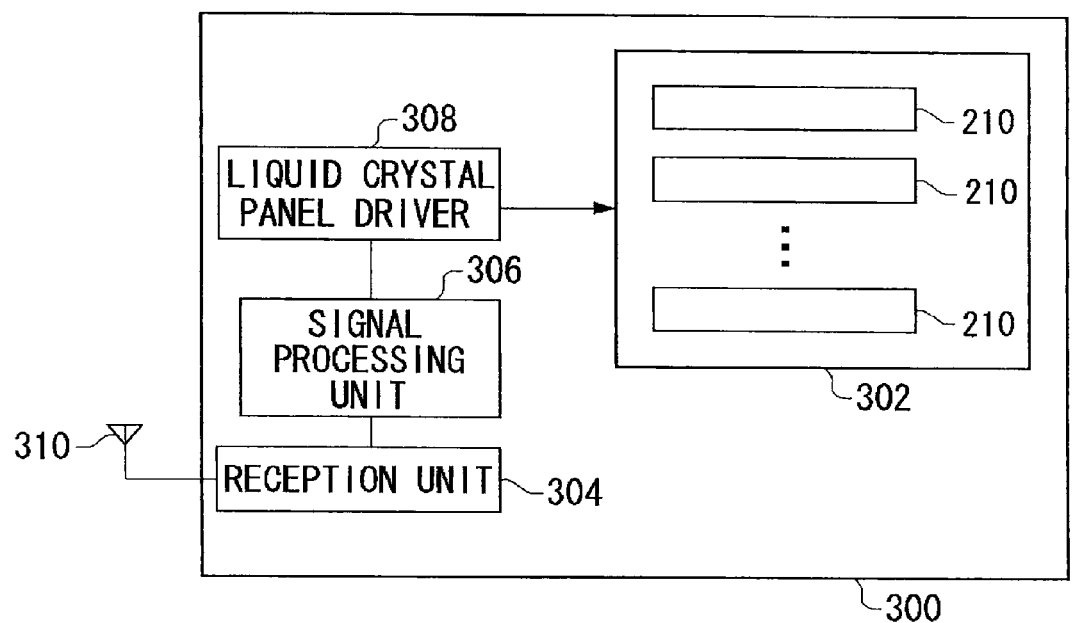
FIG. 2 is a block diagram which shows a configuration of a Liquid crystal display TV mounting the light emitting apparatus shown in FIG. 1.

FIG. 1 is a circuit diagram which shows the configuration of a light emitting apparatus 200a according to a first embodiment of the present invention. FIG. 2 is a block diagram which shows the configuration of a liquid crystal display TV 300 mounting the light emitting apparatus 200a shown in FIG. 1. The liquid crystal display TV 300 shown in FIG. 2 is connected to an antenna 310. The antenna 310 receives broadcast waves, and outputs a received signal to a reception unit 304. The reception unit 304 detects and amplifies the received signal, and outputs the received signal thus detected and amplified to a signal processing unit 306. The signal processing unit 306 demodulates the modulated data, and outputs the image data obtained by the demodulation to a liquid crystal panel driver 308. The liquid crystal panel driver 308 outputs the image data to a liquid crystal panel 302 in increments of scanning lines, thereby displaying video images and still images. Multiple fluorescent lamps 210 are arranged as a backlight on the back face of the liquid crystal panel 302. The light emitting apparatus 200a according to the present embodiment is suitably employed as a backlight for such a liquid crystal panel 302. Returning to FIG. 1, detailed description will be made regarding the configuration and the operation of the light emitting apparatus 200a.

The light emitting apparatus 200a according to the present embodiment includes: multiple fluorescent lamps, i.e., n (n is an integer) fluorescent lamps $210_1, 210_2, \ldots, 210_n$, which are collectively referred to as "fluorescent lamps 210"; and an inverter 100a which supplies AC driving voltage Vdrv to each of the fluorescent lamps 210. Each fluorescent lamp 210 is an EEFL or CCFL, which is arranged on the back face of the liquid crystal panel 302. FIG. 1 shows an arrangement including four fluorescent lamps 210. However, the present invention is not restricted to such an arrangement. The number of fluorescent lamps is determined as desired according to the area of the liquid crystal panel 302.

The inverter 100a is a DC/AC converter which converts an input voltage Vin applied to an input terminal 102 into the driving voltage Vdrv which is boosted AC voltage, and which supplies the driving voltage Vdrv to the fluorescent lamps 210 which are loads connected to an output terminal 104.

The inverter 100a is a component which supplies electric power to the multiple fluorescent lamps 210. For example, the inverter 100a generates an AC voltage of 1,000 V or more, and supplies the AC voltage thus generated to the fluorescent lamps 210. The light emission luminance of each fluorescent lamp 210 is determined by the current that flows through the fluorescent lamp 210 itself. Accordingly, irregularities in the driving currents lead to a problem of irregularities in the luminance of the backlight. Accordingly, the inverter 100a must drive the multiple fluorescent lamps 210 uniformly.

The inverter 100a includes a switching circuit 10, a transformer 12, a control circuit 20 (20a through 20c), and multiple ballast capacitors $C1_1$ through $C1_n$ (which will be collectively referred to as "ballast capacitors C1" as necessary).

The transformer 12 includes a primary winding 12a and a secondary winding 12b. The primary winding 12a of the transformer 12 is connected to the switching circuit 10. The switching circuit 10 is an H-bridge circuit or a half bridge circuit, and has a configuration including multiple transistors (not shown) connected to the primary winding 12a of the transformer 12. The switching circuit 10 alternately applies the input voltage Vin and a fixed voltage lower than the input voltage Vin, i.e., the ground voltage (0V), to the primary winding 12a according to the ON/OFF operations of the transistors. As a result, a switching voltage Vsw is applied to the primary winding 12a of the transformer 12. The ON/OFF operations of the transistors are controlled according to a control signal SIG_DRV output from the control circuit 20. The secondary winding 12b of the transformer 12 is arranged with one terminal N1 grounded, and the other terminal N2 connected to the output terminal 104.

The multiple ballast capacitors $C1_1$ through $C1_n$ are provided for the fluorescent lamps $210_1$ through $210_n$, respectively, which serve as multiple loads. One terminal of each of the ballast capacitors $C1_1$ through $C1_n$ is connected to the terminal V2 of the secondary winding 12b of the transformer 12 so as to form a common terminal. The other terminal of each of the ballast capacitors $C1_1$ through $C1_n$ is connected to the corresponding fluorescent lamps $210_1$ through $210_n$. The capacitance of each of the multiple ballast capacitors C1 is preferably set to a range between 1 pF through 100 pF. The optimum capacitance can be selected from this range based upon the impedance of the fluorescent lamp 210 by calculation or experiment. The capacitance of each ballast capacitor C1 is set according to the relative luminance of the fluorescent lamp 210 connected to the ballast capacitor C1 itself. For example, in a case in which the fluorescent lamps 210 have the same properties, and in a case in which the fluorescent lamps 210 are to be driven such that they provide uniform light emission luminance, the capacitances of the ballast capacitors C1 are set to approximately the same value. On the other hand, in a case in which the fluorescent lamps 210 are to be driven such that they provide different light emission luminance values, the capacitances of the ballast capacitors C1 are set according to desired light emission luminance values.

The ballast capacitors C1 may be provided in the form of chip elements. Also, in a case in which the inverter 100a is mounted on a printed circuit board, a part of or all of the ballast capacitors C1 may be formed using a pattern on the printed circuit board.

The control circuit 20 (20a through 20c) according to the present embodiment monitors the current that flows through a predetermined current path from among the current paths formed in the entire circuit including the inverter 100a and the fluorescent lamps 210. Furthermore, the control circuit 20 feedback controls the ON/OFF operations of the multiple transistors included in the switching circuit 10 such that the current thus monitored is maintained in a predetermined state, thereby adjusting the switching voltage Vsw to be applied to the primary winding 12a of the transformer 12, i.e., adjusting the supply of the switching electric power.

The control circuit 20 according to the present embodiment monitors the current (which will also be referred to as the "tube current Ilamp" hereafter) that flows through a current path 18 including a predetermined load, i.e., the fluorescent lamp $210_n$ selected from among the fluorescent lamps $210_1$ through $210_n$ which are multiple loads. The control circuit 20 controls the ON/OFF operations of the multiple transistors included in the switching circuit 10 such that the tube current Ilamp that flows through the fluorescent lamp $210_n$ approaches a predetermined current value.

The control circuit 20 includes a driver circuit 20a, a pulse width modulator 20b, and a feedback circuit 20c. For example, the driver circuit 20a and the pulse width modulator 20b are monolithically integrated as a function IC formed on a single semiconductor substrate including other analog circuits and digital circuits. Ordinary circuits designed as inverter control circuits can be employed as the function IC including the driver circuit 20a and the pulse width modulator 20b.

The feedback circuit 20c is provided on a current path that includes the fluorescent lamp $210_n$, and generates a feedback signal Vfb which represents the voltage value that corresponds to the tube current Ilamp. The feedback circuit 20c includes a rectification circuit 14 and a low-pass filter 16. The rectification circuit 14 is provided on the current path that includes the fluorescent lamp $210_n$, and half-wave rectifies the tube current Ilamp, thereby converting the tube current Ilamp into the voltage Vfb. A first diode D1 included in the rectification circuit 14 is arranged with the anode thereof grounded, and with the cathode thereof connected to the fluorescent lamp $210_n$. Furthermore, the second diode D2 is arranged with the anode thereof connected to the cathode of the first diode D1 and the fluorescent lamp $210_n$. A first resistor R1 is connected between the cathode of the second diode D2 and the ground terminal. The tube current Ilamp thus half-rectified flows through the first resistor R1, thereby generating the voltage drop Vfb=R1×Ilamp.

The low-pass filter 16 removes the high-frequency components of the voltage Vfb, and outputs the voltage thus filtered to the pulse width modulator 20b as a DC feedback signal Vfb'.

The pulse width modulator 20b receives the feedback signal Vfb' from the feedback circuit 20c, and generates a pulse width modulation signal (which will also be referred to as the "PWM signal Vpwm" hereafter) by making a comparison with a predetermined reference voltage Vref. The pulse width modulator 20b should be configured using known techniques. For example, the pulse width modulator 20b may have a configuration including an error amplifier and a comparator. The error amplifier amplifies the difference between the feedback signal Vfb and the predetermined reference voltage Vref. The comparator compares the difference voltage Verr output from the error amplifier with a cyclic signal Vosc in the shape of a sawtooth waveform or a triangular waveform, and outputs a PWM signal Vpwm having a duty ratio, i.e., the time ratio between the high-level state and the low-level state, which changes according to the magnitude relation between the two signals Verr and Vosc.

The driver circuit 20a receives the PWM signal Vpwm from the pulse width modulator 20b. The driver circuit 20a generates a driving signal SIG_DRV for controlling the ON/OFF operations of the multiple transistors included within the switching circuit 10, which are associated with the high-level state and the low-level state of the PWM signal Vpwm. The switching voltage Vsw, which corresponds to the driving signal SIG_DRV, is supplied to the primary winding 12a of the transformer 12.

Description will be made regarding the operation of the inverter 100a thus configured.

When the switching circuit 10 supplies the switching voltage Vsw to the primary winding 12a of the transformer 12, the AC driving voltage Vdrv is generated on the secondary winding 12b side according to the duty ratio of the PWM signal Vpwm which has been generated by the pulse width modulator 20b and the winding ratio of the transformer 12. Here, in the present embodiment, the multiple fluorescent lamps $210_1$ through $210_n$ and the ballast capacitors $C1_1$ through $C1_n$, which are respectively connected to the fluorescent lamps $210_1$ through $210_n$, form multiple current paths connected in parallel. The same voltage Vdrv is applied to each of the multiple current paths. Accordingly, a current flows through each path according to the combined impedance generated by the ballast capacitor and the load. The impedance generated by the ballast capacitor C1 and the fluorescent lamp 210 is a complex impedance.

Now, if the complex impedance is uniform over the fluorescent lamps $210_1$ through $210_n$ in the light emission operation, and if the ballast capacitors $C1_1$ through $C1_n$ have the same capacitance, then approximately the same current flows through each of the current path including the ballast capacitor $C1_1$ and the fluorescent lamp $210_1$, the current path including the ballast capacitor C12 and the fluorescent lamp $210_2$, the current path including the ballast capacitor C13 and the fluorescent lamp $210_3$, the current path including the ballast capacitor $C1_n$ and the fluorescent lamp $210_n$.

In a case in which the complex impedance is not uniform for the fluorescent lamps $210_1$ through $210_n$ in the light emission operation, and in a case in which the same tube current is to be supplied to each of the fluorescent lamps $210_1$ through $210_n$, the capacitance of each of the ballast capacitors $C1_1$ through $C1_n$ should be set so as to cancel out the difference in the impedance between the fluorescent lamps $210_1$ through $210_n$.

In a case in which the fluorescent lamps $210_1$ through $210_n$ have a uniform impedance, such an arrangement is capable of actively [Note: actively is correct.] setting the tube currents of the fluorescent lamps $210_1$ through $210_n$, i.e., the luminance values thereof, to different values by setting the capacitances of the ballast capacitors $C1_1$ through $C1_n$ to different values.

As described above, the control circuit 20 generates the PWM signal Vpwm such that the tube current Ilamp that flows through the current path 18 including the ballast capacitor $C1_n$ and the fluorescent lamp $210_n$ approaches a desired current value. Thus, with the inverter 100a according to the present embodiment, the current that flows through the fluorescent lamp $210_n$ is directly feedback controlled so as to approach a predetermined current value. Furthermore, the current that corresponds to the combined impedance of the current path including the corresponding fluorescent lamp flows through each of the other fluorescent lamps $210_1$ through $210_3$. Thus, such an arrangement allows the current value to be indirectly controlled by adjusting the capacitance of the ballast capacitor C1.

As described above, with the inverter 100a according to the present embodiment, multiple fluorescent lamps 210 can be appropriately driven such that they emit light with a desired luminance using the single control circuit 20. As a result, such an arrangement reduces the mounting area, costs, and power consumption, as compared with an arrangement in which a feedback circuit 20c or a circuit block is connected for each fluorescent lamp 210 via wiring or the like so as to provide stable tube current.

Furthermore, the capacitance of each ballast capacitor C1 is set to a value in a range between 1 pF through 100 pF, and each ballast capacitor C1 is inserted in a circuit in series with the fluorescent lamp 210. With such an arrangement, the ballast capacitor C1 cancels out irregularities in the impedance even if there are irregularities in the impedances of the fluorescent lamps $210_1$ through $210_n$ or parasitic capacitance or parasitic resistance in a peripheral circuit. This maintains the tube current of each fluorescent lamp 210 at a constant value, thereby improving the stability of the luminance.

For example, an actual inverter 100a has a parasitic capacitance at the terminal of the fluorescent lamp 210, and a parasitic capacitance between the wiring patterns. Accordingly, in a case in which such a ballast capacitor C1 is not provided, or the ballast capacitor C1 has insufficient capacitance, the parasitic capacitance affects the impedance of the path including the fluorescent lamp 210, affecting the light emission luminance. In order to solve such a problem, with the present embodiment, the ballast capacitors C1 are provided with suitable capacitances, which reduce the effects of the parasitic capacitances, thereby improving the stability of the tube currents. Furthermore, the frequency characteristics of the complex impedance of the fluorescent lamp 210 is opposite to those of the complex impedance of the ballast capacitor C1. Accordingly, the frequency dependence of the combined impedance of the ballast capacitor C1 and the fluorescent lamp 210 can be flattened by connecting the ballast capacitor C1 and the fluorescent lamp 210 in series. As a result, such an arrangement maintains the luminance of each fluorescent lamp 210 at a constant value over a wide frequency range.

Description has been made regarding a technique for controlling the luminance of each of the multiple fluorescent lamps 210. Next, description will be made regarding a technique for detecting abnormal states, such as a state in which the light emission operation cannot be performed, which can occur in an arrangement including the multiple fluorescent lamps 210.

Figure 3:
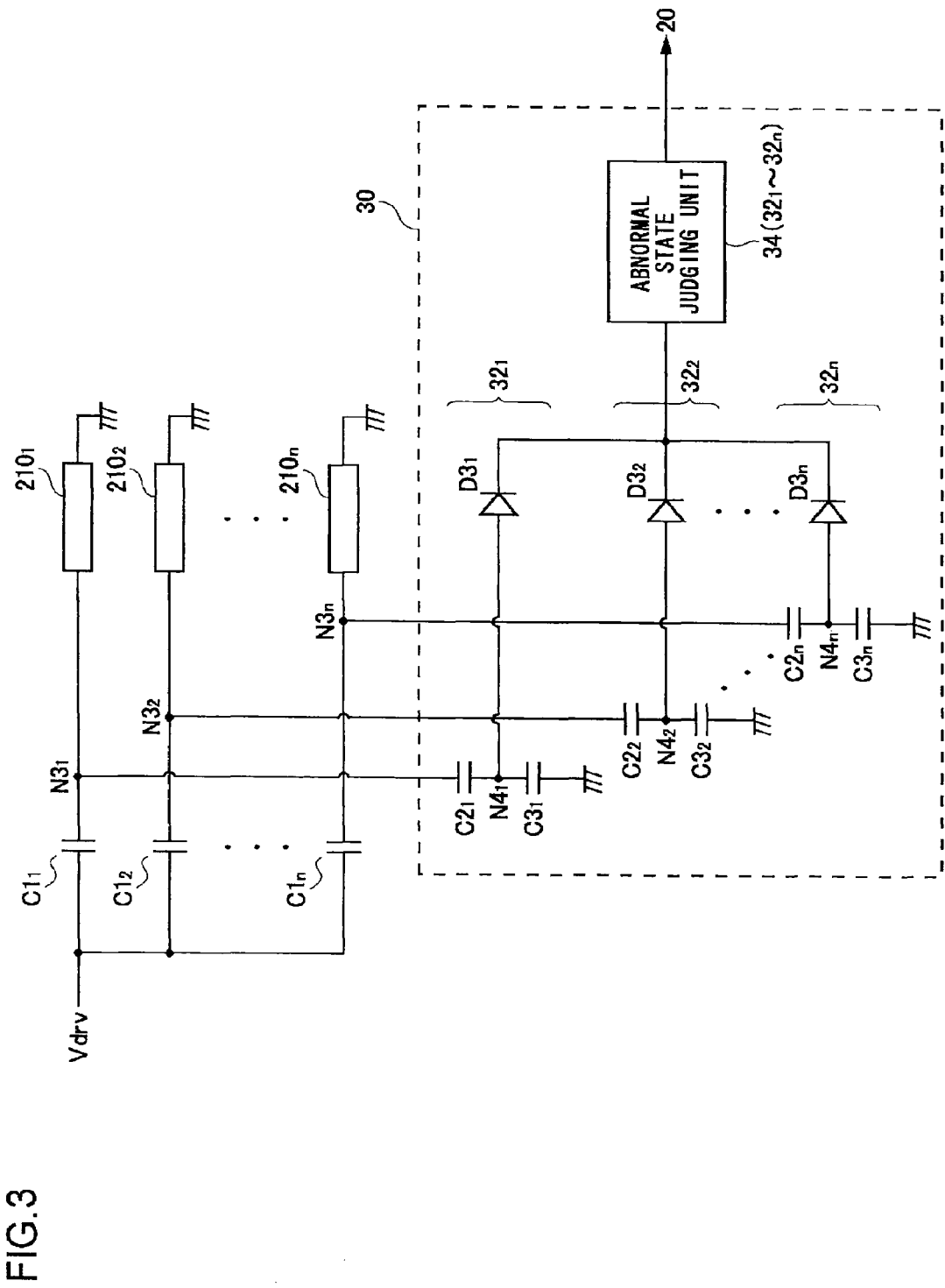
FIG. 3 is a circuit diagram which shows a configuration of an abnormal state detection circuit for an inverter according to the embodiment.

FIG. 3 is a circuit diagram which shows a part of the configuration of the inverter 100a according to the embodiment. FIG. 3 mainly shows an abnormal state detection unit 30 which detects whether or not each fluorescent lamp 210 included in the inverter 100a is in an abnormal state. The abnormal state detection unit 30 includes abnormal state detection circuits 321 through 32n (which will be collectively referred to as "abnormal state detection circuits 32") provided to the respective fluorescent lamps $210_1$ through $210_n$ which are to be monitored.

The i'th abnormal state detection circuit 32 is provided for the i'th fluorescent lamp $210_1$ which is to be monitored. The abnormal state detection circuit 32i includes a first capacitor $C2_i$, a second capacitor $C3_i$, a diode $D3_i$, and an abnormal state judging unit 34. The abnormal state judging unit 34 is shared by the multiple abnormal state detection circuits 321 through 32n.

The first capacitor $C2_i$ and the second capacitor $C3_i$ are provided in this order connected in series between a connection node $N3_i$ which connects the fluorescent lamp $210_i$ to be monitored and the corresponding ballast capacitor C1i and a fixed voltage terminal (ground terminal). A high voltage of 1,000 V or more is generated at the connection node $N3_i$. Accordingly, without any countermeasures, the voltage at the connection node $N3_i$ exceeds the voltage endurance of the abnormal state judging unit 34. With such an arrangement, the high voltage of 1000 V or more is divided and reduced by the first capacitor C2 and the second capacitor C3. In order to provide sufficiently low voltage, the condition C2<C3 must be satisfied.

The abnormal state judging unit 34 compares the electric potential at a connection node $N4_i$ that connects the first capacitor $C2_i$ and the second capacitor $C3_i$ with a predetermined threshold voltage Vth.

The diodes D3i are provided so as to allow the multiple abnormal state detection circuits 32 to share the abnormal state judging unit 34. The anode of the diode D3i is connected to the connection node $N4_i$ that connects the corresponding first capacitor $C2_i$ and the corresponding second capacitor $C3_i$. The cathodes of the diodes D3i for the respective abnormal state detection circuits 32i are connected such that they form a common terminal. The multiple diodes $D3_1$ through $D3_n$ provide a function as a maximum value circuit. With such an arrangement, an electric potential occurs at the cathode provided as a common cathode terminal, which is smaller than the highest electric potential among those that occur at the connection nodes $N4_1$ through $N4_n$ by the forward voltage Vf of the diode. The abnormal state judging unit 34 compares the electric potential at the cathode with a predetermined threshold voltage, and outputs an abnormal state detection signal S3 according to the comparison result. In a case in which the abnormal state detection signal S3 indicates an abnormal state, the control circuit 20 executes predetermined processing. For example, as the predetermined processing, a strike operation is performed for the multiple fluorescent lamps 210.

The electric potential at the connection node N3, i.e., the voltage applied to the fluorescent lamp 210 is a voltage obtained by dividing the driving voltage Vdrv by means of the capacitor C1 and the combined capacitance C4 (not shown) generated by the capacitors C2 and C3 and the parasitic capacitance of the fluorescent lamp 210. Accordingly, there is a need to set the capacitance of the capacitor C1 to a sufficiently small value as compared with the combined capacitance C4. As an example, the capacitances of the capacitors C1, C2, and C3 are set to 18 pF, 2 pF, and 220 pF, respectively.

Description will be made regarding the operation of the abnormal state detection unit 30 shown in FIG. 3. The impedance of each fluorescent lamp 210, and especially the capacitance component thereof, changes depending upon whether or not the fluorescent lamp 210 is in the normal light emission state or the state in which light emission cannot be performed. Accordingly, the combined capacitance C4, which can be measured at the connection node $N3_i$, changes depending upon whether or not the i'th fluorescent lamp $210_i$ is in the normal light emission state or the state in which light emission can not be performed. As a result, the division ratio determined by the ballast capacitor C1 and the combined capacitance C4 changes, leading to a change in the voltage at the connection node $N3_i$.

For example, while the electric potential at the connection node N3 is 1,000 V in the normal light emission state, the electric potential rises up to around 1,300 V when the light emission cannot be performed. Thus, with the inverter 100a according to the present embodiment, the electric potential at the connection node N3 is divided by the first capacitor C2 and the second capacitor C3, and the voltage thus divided is compared with a threshold voltage, and the state in which light emission cannot be performed (abnormal state) is thereby appropriately detected. It should be noted that an arrangement may be conceived in which the aforementioned electric potential is divided by resistors instead of the capacitors C2 and C3. However, the fluorescent lamp 210 is a device in which mainly the capacitance component thereof fluctuates. Accordingly, such an arrangement employing capacitors has the advantage of exhibiting a greater change in the electric potential at the connection node N3, thereby providing the advantage of facilitating detection of the abnormal state.

FIG. 3 shows an arrangement in which the abnormal state detection circuit 32 is provided for each of the fluorescent lamps 210. Also, an arrangement may be made in which the abnormal state detection circuit 32 is provided for a single fluorescent lamp 210. Also, an arrangement may be made in which the abnormal state detection circuits 32 are provided for multiple fluorescent lamps 210.

Second Embodiment

Figure 4:
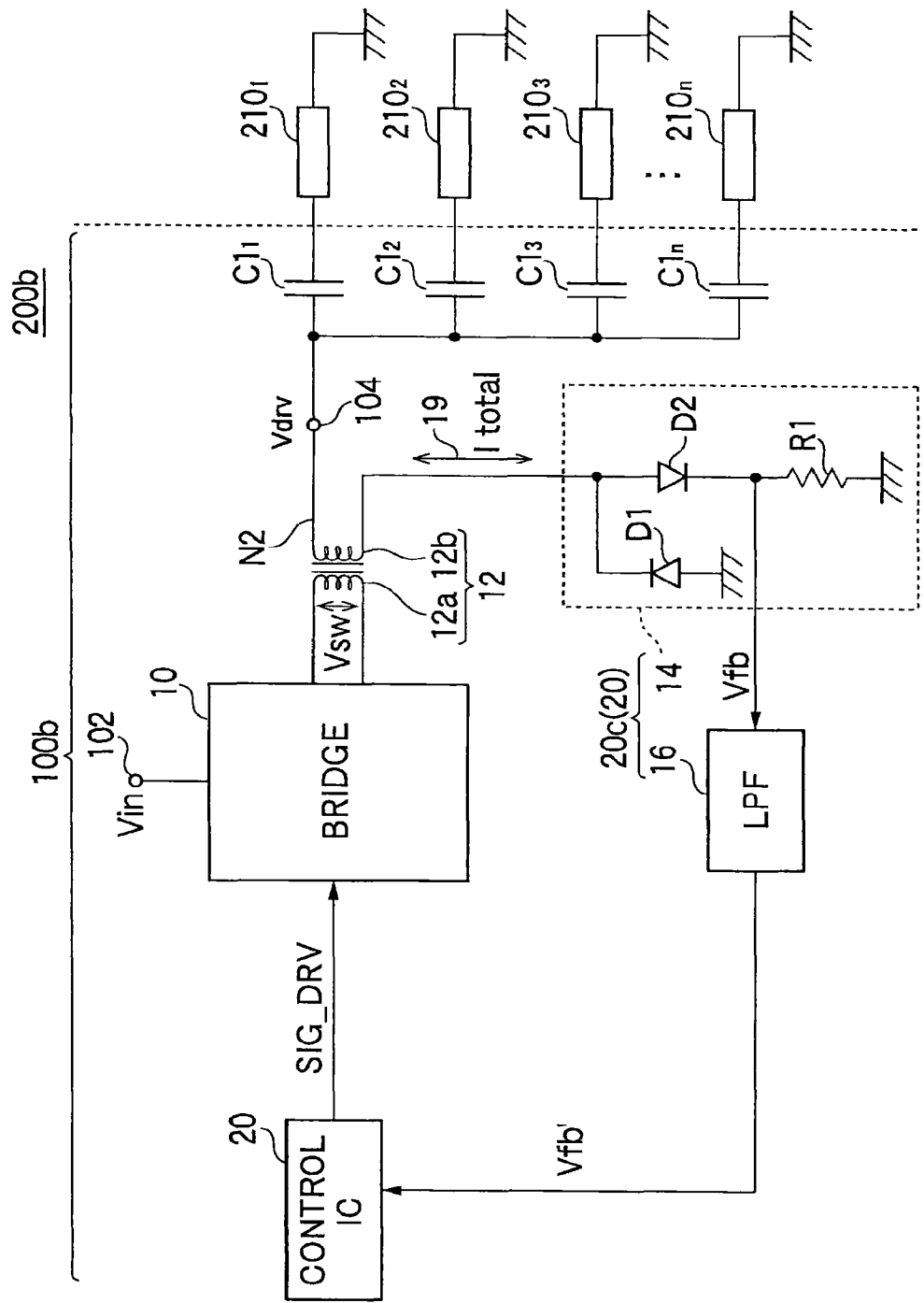
FIG. 4 is a circuit diagram which shows a configuration of a light emitting apparatus according to a second embodiment.

FIG. 4 is a circuit diagram which shows a configuration of a light emitting apparatus 200b according to a second embodiment. Description will be made regarding the configuration and the operation of an inverter 100b mainly with reference to the points of difference with respect to the inverter 100a according to the first embodiment.

The inverter 100b according to the present embodiment differs from the inverter 100a according to the first embodiment in the current path to be monitored by the control circuit 20. That is to say, in the inverter 100a according to the first embodiment, the current that flows through a path including a predetermined load is monitored. On the other hand, in the inverter 100b according to the present embodiment, the current that flows through a current path 19 including the secondary winding 12b of the transformer 12 is monitored.

In the inverter 100b shown in FIG. 4, a feedback circuit 20c is provided on the current path 19 that includes the secondary winding 12b of the transformer 12, and generates a feedback signal Vfb which indicates the voltage value that corresponds to the current Itotal that flows through the path 19. The control circuit 20 shown in FIG. 4 has a configuration including the driver circuit 20a and the pulse width modulator 20b shown in FIG. 1. The control circuit 20 controls the ON/OFF states of the multiple transistors included within the switching circuit 10 such that the current Itotal that flows through the secondary winding 12b of the transformer 12 approaches a predetermined current value.

The current Itotal that flows through the secondary winding 12b is distributed via the output terminal 104 to the current paths, each of which includes a ballast capacitor C1 and a fluorescent lamp 210. The current distributed to each current path is determined by the combined impedance of the path. For example, in a case in which each current path has the same combined impedance, the current Itotal is equally distributed to the current paths, thereby providing uniform luminance over the fluorescent lamps $210_1$ through $210_n$. Furthermore, by actively setting the combined impedances of the current paths to different values, the fluorescent lamps $210_1$ through $210_n$ can be driven such that they emit light with different luminance values.

With the second embodiment, a feedback control operation is performed such that the total current that flows through the fluorescent lamps $210_1$ through $210_n$ which are multiple loads is maintained at a constant value, thereby controlling the tube currents which flow through the fluorescent lamps $210_1$ through $210_n$.

Also, the abnormal state detection unit 30 shown in FIG. 3 can be suitably applied to the inverter 100b according to the second embodiment.

Third Embodiment

Figure 5:
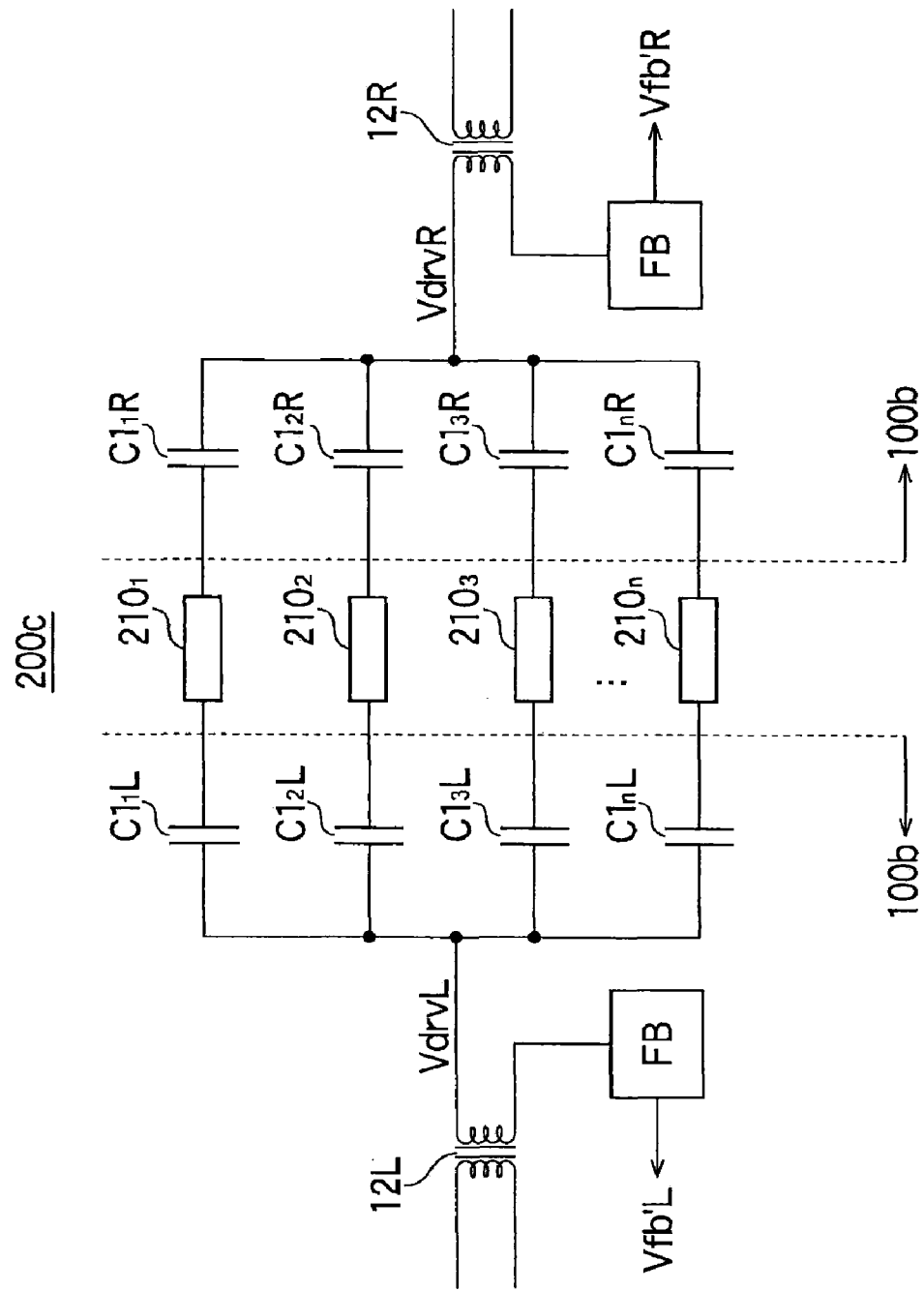
FIG. 5 is a circuit diagram which shows a part of a configuration of a light emitting apparatus according to a third embodiment.

FIG. 5 is a circuit diagram which shows a part of the configuration of a light emitting apparatus 200c according to a third embodiment.

The light emitting apparatus 200c shown in FIG. 5 includes two inverters 100b. Each inverter 100b may have the same configuration as that in the second embodiment shown in FIG. 4. The two inverters 100b are arranged on both sides of the fluorescent lamps $210_1$ through $210_n$. The inverter 100b and the inverter 100b drive the loads such that the currents that flow through the secondary windings of the transformer 12R and 12L are maintained at respectively constant values. The driving voltage VdrvR supplied by the inverter 100b and the driving voltage VdrvL supplied by the inverter 100b are opposite AC voltages.

With the present embodiment, the multiple fluorescent lamps 210 can be driven using a pair of inverters.

Also, the abnormal state detection unit 30 shown in FIG. 3 can be suitably applied to the inverters 100b according to the third embodiment. With such an arrangement, the abnormal state detection unit 30 may be provided for either of the two inverters 100b. Also, the abnormal state detection unit 30 may be provided for each of the two inverters 100b.

Fourth Embodiment

Figure 6:
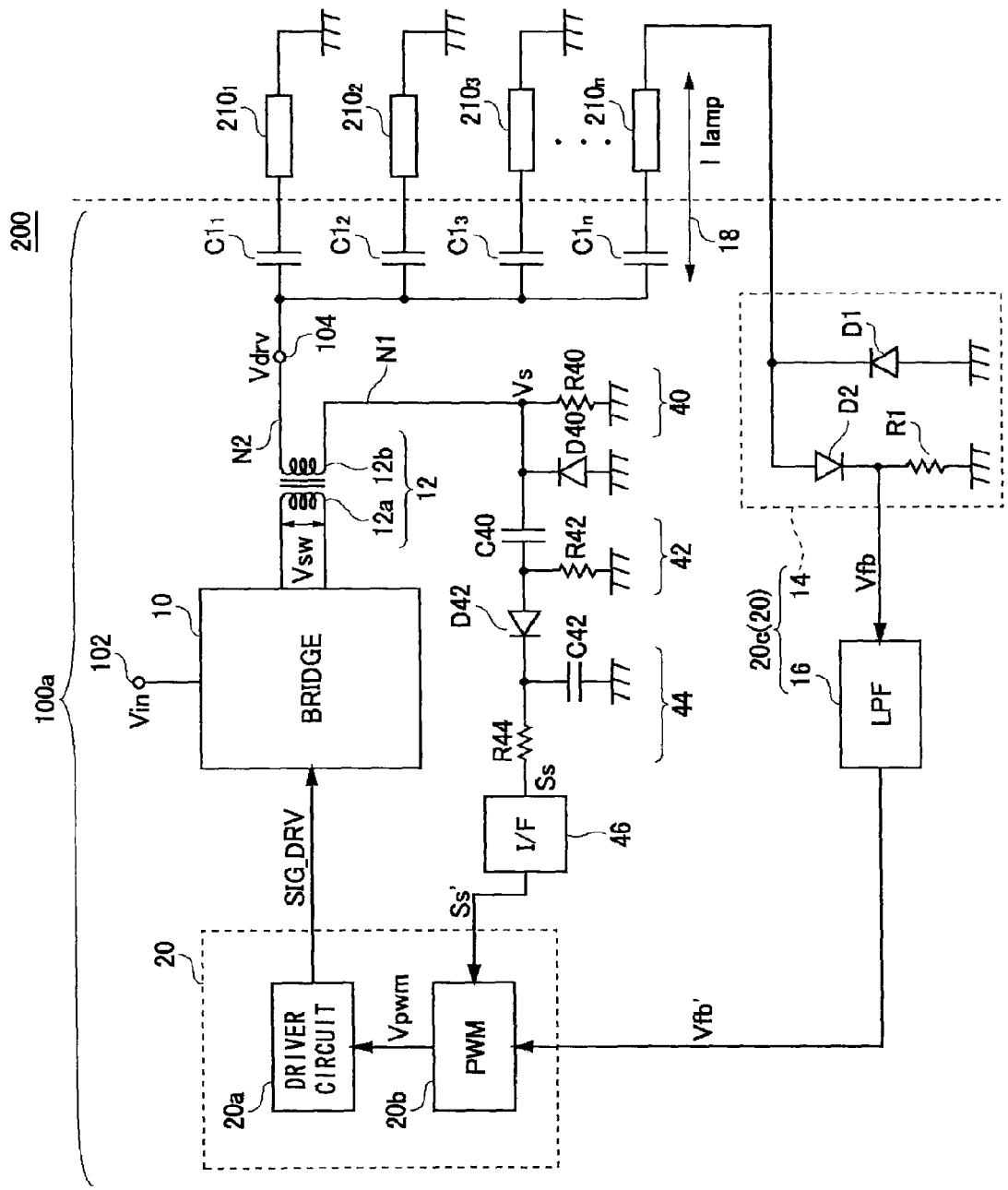
FIG. 6 is a circuit diagram which shows a configuration of a light emitting apparatus according to a fourth embodiment of the present invention.

FIG. 6 is a circuit diagram which shows a configuration of a light emitting apparatus 200 according to a fourth embodiment of the present invention. An inverter 100a shown in FIG. 6 further includes a current/voltage conversion circuit 40, a filter 42, an integrator 44, and an interface circuit 46, in addition to the components shown in FIG. 1.

The current/voltage conversion circuit 40 converts the current that flows through the secondary winding 12b of the transformer 12 into a voltage. The current/voltage conversion circuit 40 shown in FIG. 6 is arranged on the same path as that on which the secondary winding 12b is arranged, and includes a resistor R40 with one terminal thereof set to a fixed voltage. The voltage drop Vs (which will be referred to as "detection voltage") across the resistor R40 is proportional to the total value of the current Ilamp that flows through all the fluorescent lamps 210.

A diode D40 rectifies the detection voltage Vs in cooperation with a diode D42 provided as a downstream diode.

The filter 42 is a high-pass filter which removes the low-frequency components of the detection voltage Vs output from the current/voltage conversion circuit 40. The term "low-frequency components" as used here represents the frequency components which are equal to or smaller than the frequency of the AC driving voltage Vdrv. The cutoff frequency of the filter is preferably set to a frequency approximately 5 to 20 times higher than the frequency of the driving voltage Vdrv. The filter 42 may have a simple configuration including a capacitor C40 and a resistor R42.

The integrator 44 receives the output of the filter 42 via the diode D42. The integrator 44 integrates (in other words, flattens) the output voltage (having a rectified waveform) output from the filter 42, and outputs the voltage thus integrated as a detection signal Ss. The interface circuit 46 is provided as necessary, and converts the detection signal Ss into a signal Ss' according to the input voltage range defined for the internal circuit of the control circuit 20 or according to the design of logical values (active high level or active low level).

The control circuit 20 detects whether or not a fluorescent lamp 210 is in an abnormal state based upon the detection signal Ss' received from the integrator 44. In a case in which an abnormal state has been detected, predetermined protection processing is executed.

The above is the overall configuration of the inverter 100a according to the embodiment. Next, description will be made regarding the operation for detecting an abnormal state.

In an abnormal state such as an arc discharge state, high-frequency components which are higher than the frequency of the driving voltage Vdrv are convolved with the current that flows through the secondary winding 12b of the transformer 12. With the inverter 100a shown in FIG. 6, such high-frequency components are extracted by the filter 42 so as to generate the detection signal Ss, thereby enabling an abnormal state to be detected.

It is needless to say that an application of the abnormal state detection technique using the current/voltage conversion circuit 40, the filter 42, and the integrator 44 is not restricted to such a driving topology shown in FIG. 6. For example, such a technique can be applied to an arrangement in which a single fluorescent lamp 210 is driven.

Figure 7A:
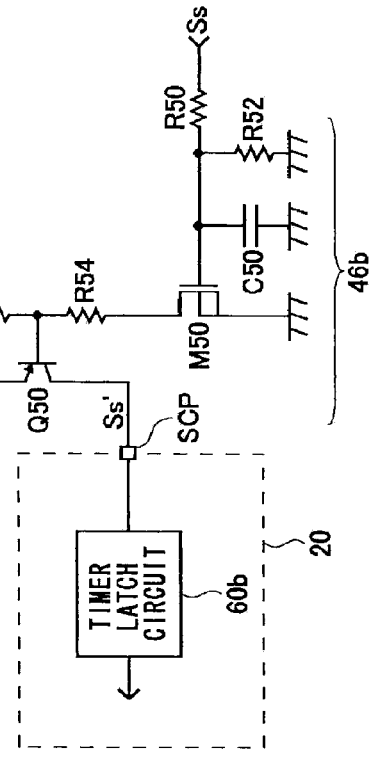
FIG. 7A through FIG. 7C are circuit diagrams which show a configuration of an interface circuit and a protection circuit included within a control circuit.
Figure 7B:
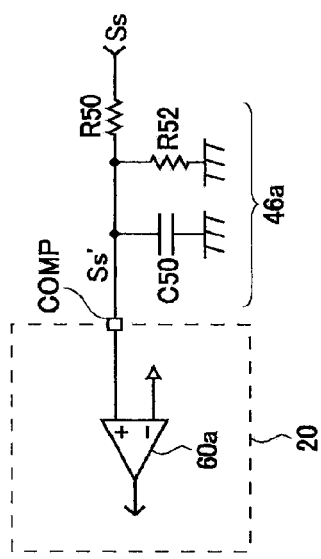
Figure 7C:
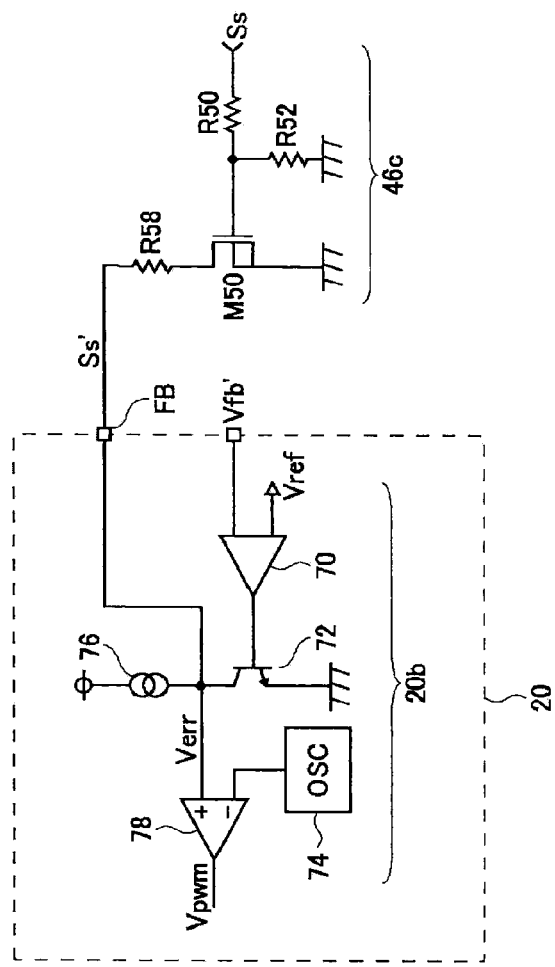

Next, specific description will be made regarding an example of protection processing. FIG. 7A through FIG. 7C are circuit diagrams which show the configurations of the interface circuit 46 and a protection circuit 60 included within the control circuit 20.

The interface circuit 46a shown in FIG. 7A includes resistors R50 and R52 and a capacitor C50. The detection signal Ss is divided by the resistors R50 and R52, and the detection signal Ss thus divided is flattened by the capacitor C50, thereby generating the detection signal Ss'. A comparator 60a compares the detection signal Ss' input via a COMP terminal with a threshold voltage Vth. When Ss' is greater than Vth, the comparator 60a outputs a signal in the high-level state. When the comparator 60a outputs a signal in the high-level state, the control circuit 20 sets the logical value SIG_DRV to a fixed value.

In many cases, the control circuit for the inverter mounts a comparator for overvoltage protection (OVP), and includes a COMP terminal for monitoring an external signal to be monitored. With the circuit shown in FIG. 7A, the detection signal Ss' is input to the COMP terminal. This allows an abnormal state to be detected, thereby allowing suitable circuit protection to be executed.

An interface circuit 46b shown in FIG. 7B further includes a transistor M50, resistors R54 and R56, and a transistor Q50, in addition to the components included in the interface circuit 46a shown in FIG. 7A. The electric potential at the capacitor C50 is input to the gate of the transistor M50. The collector of the transistor Q50 is connected to the power supply terminal, and the base thereof is pulled up via the resistor R56. The resistor R54 is arranged between the drain of the transistor M50 and the base of the transistor Q50. The interface circuit 46b outputs the electric potential at the collector of the transistor Q50 to the control circuit 20 as the detection signal Ss'.

In a case in which the detection signal Ss' exceeds a predetermined threshold voltage, the protection circuit 60 included in the control circuit 20 executes predetermined protection processing.

The control circuit for the inverter mounts a timer latch circuit for short circuit protection (SCP), and includes an SCP terminal to which a capacitor (not shown) is to be connected for adjusting the time constant of the timer. In a case in which the timer latch circuit is used for short circuit protection according to its original function, a capacitor is connected to the SCP terminal. With such an arrangement, in a case in which the control circuit 20 detects a short circuit state, a constant current is supplied to the capacitor connected to the SCP terminal, thereby starting a charging operation. When the electric potential at the SCP terminal reaches a predetermined threshold voltage, the timer latch circuit 60b executes predetermined protection processing. Instead of connecting such a capacitor to the SCP terminal, the interface circuit 46b is connected to the SCP terminal, and the detection signal Ss' is input to the SCP terminal, thereby providing circuit protection.

Referring to FIG. 7C, a control circuit for an inverter includes the pulse width modulator 20b shown in FIG. 6. The pulse width modulator 20b includes an error amplifier 70, an oscillator 74, a current source 76, and a PWM comparator 78. The error amplifier 70 amplifies the difference between the feedback signal Vfb' which indicates the electrical state of the fluorescent lamp 210 and a predetermined reference voltage Vref. The error amplifier 70 has an open collector output (72). The collector of the transistor 72 provided as an output stage is connected to the current source 76. The PWM comparator 78 makes a comparison between the difference voltage Verr which occurs at the collector of the transistor 72 and a cyclic signal Vosc generated by the oscillator 74 in the shape of a triangular waveform or a sawtooth waveform so as to generate a PWM signal Vpwm. The collector of the transistor 72 is connected to the FB terminal.

The interface circuit 46c includes resistors R50 and R52, a transistor M50, and a resistor R58. The detection signal Ss is divided by the resistors R50 and R52, and the voltage thus divided is input to the gate of the transistor M50. One terminal of the resistor R58 is connected to the drain of the transistor M50, and the other terminal thereof is connected to the FB terminal of the control circuit 20.

In a case in which the detection signal Ss becomes greater than the predetermined threshold value, the transistor M50 is switched to the ON state. The resistor R58 is thus connected in parallel with the transistor 72, thereby allowing the current generated by the current source 76 to flow through the resistor R58 side. As a result, the output level Verr of the error amplifier 70 shifts such that the duty ratio of the PWM signal Vpwm is reduced.

That is to say, in a case in which the detection signal Ss received from the integrator 44 is greater than the predetermined threshold, the control circuit 20 judges that the abnormal state has been detected, and reduces the duty ratio of the ON/OFF operation of the switching circuit 10. By reducing the duty ratio, such an arrangement is capable of reducing electric power while maintaining the light emission state of the fluorescent lamps 210, thereby protecting the circuit.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

Description has been made regarding an arrangement in which the current that flows through a predetermined load, or the current that flows through a current path including the secondary winding 12b of the transformer 12 is monitored. However, the present invention is not restricted to such an arrangement. Also, an arrangement may be made in which the current that flows through the primary winding 12a of the transformer 12 or the current that flows through a transistor included in the switching circuit 10 is monitored.

Furthermore, the driving method for driving the fluorescent lamps 210 is not restricted to those described in the embodiments. Other known techniques can be employed for driving the multiple fluorescent lamps 210. The present invention is not restricted to such a driving method having a particular topology. The present invention can be applied to various driving methods.

Furthermore, the loads to be driven by the inverter 100a according to the present embodiment are not restricted to the fluorescent tubes. The present invention can also be applied to the driving operations for various kinds of devices which require an AC high voltage.

The settings of the logical values, such as the high-level state and the low-level state of the logic circuits, have been described in the present embodiment for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. An inverter apparatus which converts an input voltage into an AC driving voltage, and which supplies the AC driving voltage thus converted to a plurality of loads, including:
   a transformer having a primary winding and a secondary winding;
   a switching circuit including a plurality of transistors connected to the primary winding of the transformer, and which alternately applies, to the primary winding of the transformer, the input voltage and a fixed voltage which is lower than the input voltage according to the ON/OFF operations of the transistors;
   a plurality of ballast capacitors which are respectively provided for the plurality of loads, and of which one terminal of each ballast capacitor is connected to the secondary winding of the transformer so as to form a common terminal, and the other terminals of which are respectively connected to the plurality of loads;
   a control circuit which monitors an electric current that flows through a predetermined current path among current paths included in the entire circuit including the inverter apparatus and the loads, and which feedback controls the ON/OFF states of the plurality of transistors included in the switching circuit such that the current thus monitored is maintained in a predetermined state, thereby adjusting a switching electric power supplied to the primary winding of the transformer; and
   an abnormal state detection circuit provided for a load which is a monitoring target selected from among the plurality of loads,
   wherein the abnormal state detection circuit includes:
      a first capacitor and a second capacitor arranged in this order in series between a connection node that connects the load to be monitored and the ballast capacitor that corresponds to the load and a fixed voltage terminal; and
      an abnormal state judging unit which compares the voltage at a connection node which connects the first capacitor and the second capacitor with a predetermined threshold voltage.

2. An inverter apparatus according to claim 1, wherein a plurality of the abnormal state detection circuits are respectively provided for the plurality of loads.

3. An inverter apparatus according to claim 1, wherein each of the plurality of loads is a device having capacitance that changes depending upon whether the operation state is normal or abnormal.

4. An inverter apparatus according to claim 1, wherein each of the plurality of loads is a fluorescent lamp.

5. An inverter apparatus according to claim 2, wherein each of the plurality of abnormal state detection circuits further includes a diode, the anode of which is connected to a connection node that connects the corresponding first capacitor and the corresponding second capacitor,
   and wherein the cathodes of the diodes, which are respectively provided for the plurality of abnormal state detection circuits, are connected so as to form a common cathode terminal,
   and wherein the plurality of abnormal state detection circuits share a single abnormal state judging unit which compares the voltage at the cathode of the diodes with the threshold voltage.

6. An inverter apparatus according to claim 4, wherein the capacitances of the plurality of ballast capacitors are set according to the relative luminance values provided by the plurality of fluorescent lamps.

7. An inverter apparatus according to claim 2, wherein at least a part of the plurality of ballast capacitors and the first and second capacitors, which are respectively provided for the plurality of abnormal state detection circuits, is configured of a pattern circuit formed on a printed circuit board on which the inverter apparatus is mounted.

8. An inverter apparatus according to claim 1, wherein the control circuit monitors a current that flows through a current path including a predetermined load from among the plurality of loads,
   and wherein the control circuit controls the ON/OFF states of the plurality of transistors included in the switching circuit such that the current that flows through the predetermined load approaches a predetermined current value.

9. An inverter apparatus according to claim 8, wherein the control circuit includes:
   a feedback circuit provided on a current path including the predetermined load, and which generates a feedback signal which indicates a voltage value that corresponds to a current that flows through the predetermined load;
   a pulse modulator which receives the feedback signal from the feedback circuit, and generates a pulse modulation signal by comparing the feedback signal with a predetermined reference voltage; and
   a driver circuit which receives the pulse modulation signal from the pulse modulator, and which controls the ON/OFF operations of the plurality of transistors included in the switching circuit according to the pulse modulation signal.

10. An inverter apparatus according to claim 1, wherein the control circuit monitors a current that flows through a current path including a secondary winding of the transformer, and controls the ON/OFF states of the plurality of transistors included in the switching circuit such that a current that flows through the secondary winding of the transformer approaches a predetermined current value.

11. An inverter apparatus according to claim 10, wherein the control circuit includes:
- a feedback circuit which is provided on a current path including the secondary winding of the transformer, and which generates a feedback signal which indicates a voltage value that corresponds to the current that flows through the secondary winding of the transformer;
- a pulse modulator which receives the feedback signal from the feedback circuit, and which generates a pulse modulation signal by comparing the feedback signal with a predetermined reference voltage; and
- a driver circuit which receives the pulse modulation signal from the pulse modulator, and which controls the ON/OFF operations of the plurality of transistors included in the switching circuit according to the pulse modulation signal.

12. A light emitting apparatus including:
- a plurality of fluorescent lamps;
- an inverter apparatus according to claim 1, which supplies an AC driving voltage to one terminal of each of the plurality of fluorescent lamps provided as loads.

13. A light emitting apparatus according to claim 12, further including an inverter apparatus according to claim 1, which supplies an AC driving voltage to the other terminal of each of the plurality of fluorescent lamps provided as loads,
wherein the inverter apparatus provided on the one terminal side of the plurality of fluorescent lamps and the other inverter provided on the other terminal side generate driving voltages with opposite phases.

14. A light emitting apparatus according to claim 12, wherein each of the fluorescent lamps is a cold cathode fluorescent lamp or an external electrode fluorescent lamp.

15. A display apparatus including:
- a liquid crystal panel; and
- a light emitting apparatus according to claim 12, arranged as a backlight on the back face of the liquid crystal panel.

* * * * *